(12) United States Patent
Schenker et al.

(10) Patent No.: US 9,574,489 B2
(45) Date of Patent: Feb. 21, 2017

(54) MULTI-STAGE TURBO WITH CONTINUOUS FEEDBACK CONTROL

(71) Applicant: Boise State University, Boise, ID (US)

(72) Inventors: David Paul Schenker, Boise, ID (US); Adrian Rothenbuhler, Boise, ID (US)

(73) Assignee: BOISE STATE UNIVERSITY, Boise, ID (US)

( * ) Notice: Subject to any disclaimer, the term of this patent is extended or adjusted under 35 U.S.C. 154(b) by 8 days.

(21) Appl. No.: 13/911,973

(22) Filed: Jun. 6, 2013

(65) Prior Publication Data

US 2013/0327039 A1 Dec. 12, 2013

Related U.S. Application Data

(60) Provisional application No. 61/656,971, filed on Jun. 7, 2012.

(51) Int. Cl.
| | |
|---|---|
| *F02D 23/00* | (2006.01) |
| *F02B 37/00* | (2006.01) |
| *F02B 37/18* | (2006.01) |
| *F02B 37/24* | (2006.01) |

(52) U.S. Cl.
CPC ............ *F02B 37/004* (2013.01); *F02B 37/18* (2013.01); *F02B 37/186* (2013.01); *F02B 37/24* (2013.01); *Y02T 10/144* (2013.01)

(58) Field of Classification Search
CPC ....... F02B 37/004; F02B 37/18; F02B 37/186; F02B 37/24; Y02T 10/144
See application file for complete search history.

(56) References Cited

U.S. PATENT DOCUMENTS

| | | | |
|---|---|---|---|
| 3,250,068 A | 5/1966 | Vulliamy | |
| 3,303,348 A | 2/1967 | Cox et al. | |
| 4,401,081 A | 8/1983 | Wessel et al. | |
| 4,459,809 A | 7/1984 | Tadokoro et al. | |
| 4,702,080 A | 10/1987 | Ueno et al. | |
| 5,063,744 A * | 11/1991 | Ishiyama et al. | 60/600 |
| 5,081,842 A | 1/1992 | Sugiyama et al. | |
| 5,083,434 A | 1/1992 | Dahlgren et al. | |
| 5,142,866 A | 9/1992 | Yanagihara et al. | |
| 5,144,803 A | 9/1992 | Yoshioka | |
| 5,154,058 A | 10/1992 | Mizuno | |

(Continued)

FOREIGN PATENT DOCUMENTS

| | | | | |
|---|---|---|---|---|
| FR | WO2010112718 | * | 7/2010 | ............ F02D 23/00 |
| JP | WO2012057191 | * | 3/2012 | ............ F04D 13/06 |

OTHER PUBLICATIONS http://content2.smcetech.com/pdf/manuals/Profi-E.pdf, Mar. 10, 2009, SMC Etech.*

*Primary Examiner* — Jesse Bogue
(74) *Attorney, Agent, or Firm* — Parsons Behle & Latimer (57) ABSTRACT

A turbocharger control system for an internal combustion engine having first and second turbochargers connected in series includes first and second pressure sensors, and a controller. The first and second pressure sensors are disposed in an air intake of the engine, and are configured to sense boost pressure of the first and second turbochargers, respectively. The controller is configured to receive pressure signals from the first and second pressure sensors, and to control operation of at least one of the first and second turbochargers to maintain a desired boost pressure ratio.

20 Claims, 4 Drawing Sheets

(56) References Cited

U.S. PATENT DOCUMENTS

| | | | |
|---|---|---|---|
| 5,605,044 A | 2/1997 | Zimmer et al. | |
| 5,974,801 A * | 11/1999 | Houtz | F02B 37/013 60/602 |
| 6,076,353 A | 6/2000 | Freudenberg et al. | |
| 6,112,523 A * | 9/2000 | Kamo et al. | 60/612 |
| 6,202,414 B1 | 3/2001 | Schmidt et al. | |
| 6,311,493 B1 * | 11/2001 | Kurihara | F02B 37/013 60/600 |
| 6,658,848 B1 * | 12/2003 | Pierpont | 60/602 |
| 6,694,736 B2 | 2/2004 | Pflüger | |
| 6,917,873 B2 | 7/2005 | Itoyama | |
| 7,066,157 B2 | 6/2006 | Takahashi et al. | |
| 7,076,955 B2 | 7/2006 | Herz et al. | |
| 7,305,828 B2 | 12/2007 | Todoroki et al. | |
| 7,735,320 B2 | 6/2010 | Yanakiev | |
| 7,770,392 B2 * | 8/2010 | Birkner et al. | 60/602 |
| 7,958,730 B2 | 6/2011 | Stewart | |
| 8,522,551 B2 * | 9/2013 | Tomita et al. | 60/612 |
| 8,720,200 B2 * | 5/2014 | Tsukamoto | 60/602 |
| 8,931,271 B2 * | 1/2015 | Fontvieille | F02D 23/00 60/602 |
| 2006/0059910 A1 | 3/2006 | Spaeder et al. | |
| 2008/0148727 A1 * | 6/2008 | de Ojeda | F02B 37/013 60/602 |
| 2008/0250786 A1 * | 10/2008 | Robinson | 60/602 |
| 2009/0107140 A1 * | 4/2009 | Pursifull | 60/600 |
| 2009/0314082 A1 * | 12/2009 | Sujan | F01D 17/06 73/497 |
| 2010/0300087 A1 * | 12/2010 | Liu | F02B 37/004 60/602 |
| 2011/0225967 A1 * | 9/2011 | Karnik | F02B 37/16 60/602 |
| 2012/0222417 A1 * | 9/2012 | Fontvieille | F02D 23/00 60/602 |
| 2013/0074492 A1 * | 3/2013 | Chi | F02B 37/18 60/602 |
| 2013/0209291 A1 * | 8/2013 | Kitsukawa | F02B 37/013 417/410.1 |

* cited by examiner

MULTI-STAGE TURBO WITH CONTINUOUS FEEDBACK CONTROL

PRIORITY CLAIM

The present application claims the benefit of U.S. provisional patent application Ser. No. 61/656,971, filed on Jun. 7, 2012, entitled MULTI-STAGE TURBO WITH CONTINUOUS FEEDBACK CONTROL, the disclosure of which is incorporated herein by reference in its entirety.

BACKGROUND

Technical Field

The present disclosure relates generally to turbo charger systems for internal combustion engines. More specifically, the present disclosure relates to a multi-stage turbo charger system with continuous feedback control.

Background

In turbo-charged engines with multiple turbo chargers (usually two), it is desirable that the turbo chargers operate together efficiently in view of changing engine operating conditions (e.g. speed, load, etc.). Many multi-stage turbo systems do not achieve this. One challenge is that the operation of the wastegate is sometimes not controlled in a way that keeps the turbo compressors operating at desired efficiency. For example, on/off-type controllers have been used, but these often do not produce desired results. While systems exist that can keep one of the turbo system parameters (e.g. a single pressure) at a constant value, this does not guarantee a pressure ratio for high efficiency.

SUMMARY

It has been recognized that it would be desirable to have a multi-stage turbo system in which the turbo chargers operate together efficiently in view of changing engine operating conditions.

It has also been recognized that it would be desirable to have a multi-stage turbo system in which operating parameters of the turbo chargers can be changed via software changes in a control system in view of changing engine operating conditions or engine output desires.

The present disclosure advantageously addresses one or more of the aforementioned issues by providing a turbocharger control system for an internal combustion engine having first and second turbochargers connected in series. In one embodiment the system includes first and second pressure sensors, and a controller. The first and second pressure sensors are disposed in an air intake of the engine, and are configured to sense boost pressure of the first and second turbochargers, respectively. The controller is configured to receive pressure signals from the first and second pressure sensors, and to control operation of at least one of the first and second turbochargers to maintain a desired boost pressure ratio.

In one specific embodiment, the system includes a wastegate and a regulator valve, configured to control the wastegate in response to an output signal of the controller. In another specific embodiment, at least one of the first and second turbochargers is a variable geometry turbine (VGT) or variable nozzle turbine (VNT), and the controller is configured to send signals to adjust settings of each VGT or VNT to maintain the desired boost pressure ratio.

In another embodiment, the disclosure provides a multi-stage turbocharged internal combustion engine system. The engine system includes an air intake and an exhaust conduit, first and second turbochargers in series, a wastegate, disposed in the exhaust conduit in parallel with a turbine of the second turbocharger, and first and second pressure sensors, disposed in the air intake downstream of the first and second turbochargers, respectively. The system also includes a regulator valve, coupled to receive intake air downstream of the second turbocharger and to provide regulated air to the wastegate, and a controller, coupled to receive input from the first and second pressure sensors, and configured to control the regulator valve to adjust pressure of the regulated air.

In another embodiment, the disclosure provides a method for controlling a multi-stage turbocharger system of an internal combustion engine. The method includes sensing boost pressures from first and second turbochargers disposed in series, respectively, during operation of the engine, and determining a boost pressure ratio of the boost pressures using a computerized controller having a processor and system memory. The method further includes controlling operation of at least one of the first and second turbochargers by the controller to maintain a desired boost pressure ratio.

In one specific embodiment, controlling operation of at least one of the first and second turbochargers includes controlling operation of a wastegate associated with one of the turbochargers. In another specific embodiment, controlling operation of at least one of the first and second turbochargers includes controlling settings of a variable geometry turbine or variable nozzle turbine.

The present disclosure will now be described more fully with reference to the accompanying drawings, which are intended to be read in conjunction with both this summary, the detailed description, and any preferred or particular embodiments specifically discussed or otherwise disclosed. This disclosure may, however, be embodied in many different forms and should not be construed as limited to the embodiments set forth herein; rather, these embodiments are provided by way of illustration only so that this disclosure will be thorough, and fully convey the full scope of the invention to those skilled in the art.

DETAILED DESCRIPTION

In the following description, reference is made to the accompanying drawings that form a part thereof, and in which is shown by way of illustration specific exemplary embodiments in which the invention may be practiced. These embodiments are described in sufficient detail to enable those skilled in the art to practice the invention, and it is to be understood that modifications to the various disclosed embodiments may be made, and other embodiments may be utilized, without departing from the spirit and scope of the present invention. The following detailed description is, therefore, not to be taken in a limiting sense.

It has been found that continuous feedback of boost pressures in a multi-stage turbocharged engine system can allow better control of the system and thus higher efficiency. Specifically, it has been found that continuous feedback of boost pressures allows better control of the wastegate, and can thus allow higher efficiency co-operation of multiple turbocharger units. As noted above, on/off-type controllers have been used in the past, but these often do not produce desired results. It has been found that a proportional valve with a PID controller can provide continuously variable control for a wastegate for this purpose.

Figure 1:
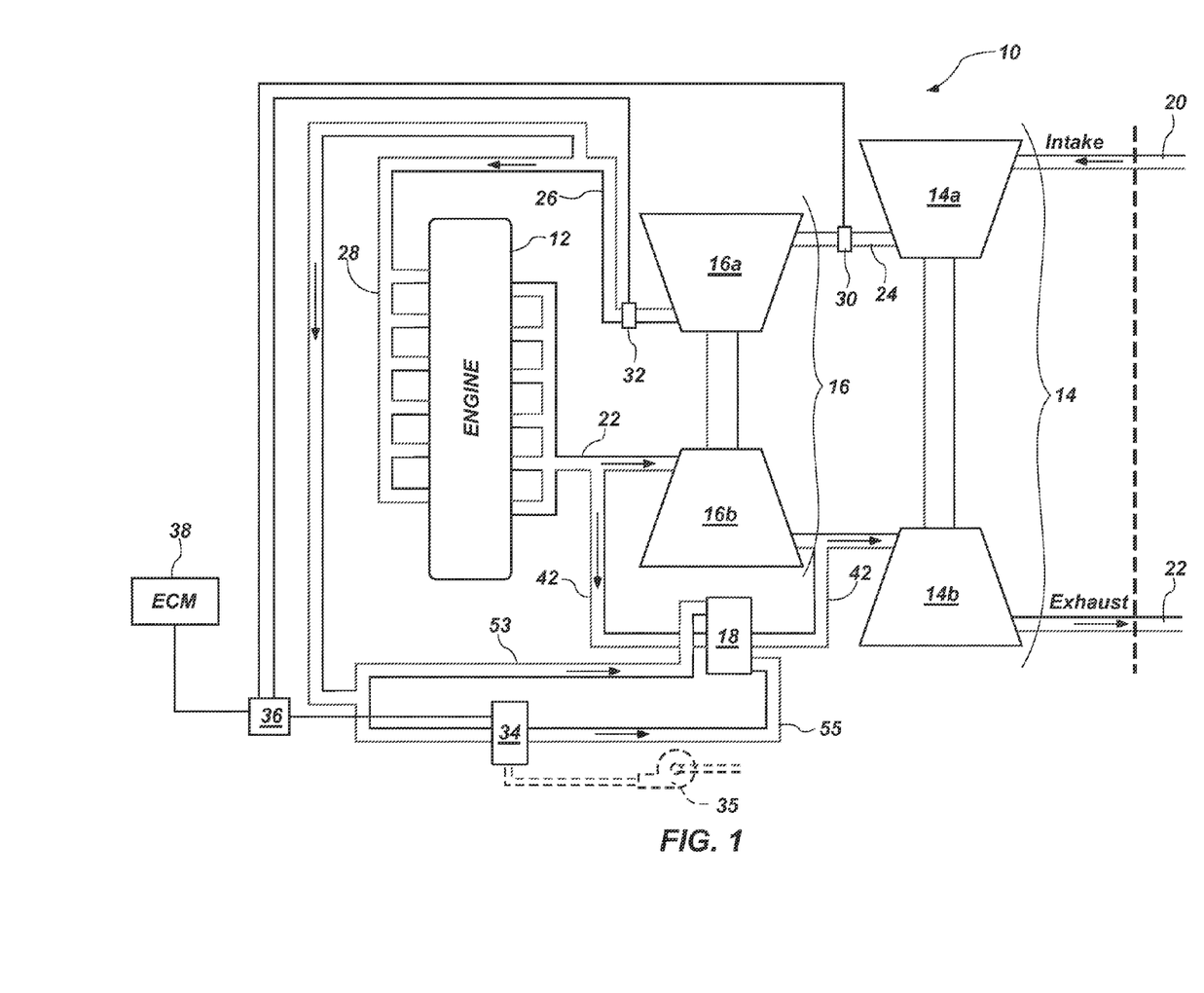
FIG. 1 is a schematic diagram of an embodiment of a multi-stage turbo system with continuous feedback control in accordance with the present disclosure.

Advantageously, this disclosure presents a multi-stage turbo charger system with continuous feedback control. A schematic diagram of a turbocharger system 10 for an internal combustion engine 12 in accordance with this disclosure is shown in FIG. 1. The system 10 includes a first turbocharger, indicated generally at 14, and a second turbocharger, indicated generally at 16, arranged in series, and a wastegate 18. Each turbocharger 14, 16 includes a turbocompressor portion 14a, 16a, respectively, disposed in series in an intake air flow conduit 20 that draws combustion air from the atmosphere, and a turbine portion 14b, 16b, respectively, disposed in series in the exhaust flow conduit 22 that directs exhaust gasses from the engine to atmosphere. High pressure exhaust gasses from the engine 12 turn the turbine portions 14b, 16b of the turbocharger devices, allowing the turbocompressor portions 14a, 16a to compress intake air. The wastegate 18 is a valve that can open to allow a portion of the exhaust flow to bypass the second turbine 16b, to control maximum boost.

The intake air conduit 20 is further divided into a cold pipe 24, Which extends between the first and second turbocompressor portions, 14a, 16a, and a manifold pipe 26, Which connects directly to the intake manifold 28, downstream of the second turbocompressor 16a. The turbocharger system 10 includes a first pressure sensor 30 disposed in the cold pipe 24, and a second pressure sensor 32 disposed in the manifold pipe 26. The air in the manifold pipe 26, downstream of the second turbocompressor 16a, is referred to herein as "intake air" or "reference air." A regulator valve 34 is coupled to receive intake air and to provide regulated air to the wastegate 18 through a regulated air conduit 55. This regulator valve 34 can be a proportional, constantly-adjustable variable electro-pneumatic regulator valve, such as the Series ITV electro-pneumatic regulator valves (e.g. ITV 1000, 2000, 3000) Which are available from SMC Corporation of America, headquartered in Noblesville, Ind. Intake air is also directly provided to the wastegate 18 via a reference air conduit 53, and provides reference air to the wastegate 18. The pressure differential between the reference air and the regulated air from the regulator valve 34 controls operation of the wastegate 18, as discussed below.

A PID controller 36 is coupled to receive electrical input signals from the first pressure sensor 30 and second pressure sensor 32, and to provide output to the regulator valve 34, in order to control the pressure of the regulated air. This output controls the regulator valve 34 to adjust the regulated air so that the wastegate 18 operates to maintain a desired pressure ratio of output from both the first turbocharger 14 and last turbocharger 16. Those of skill in the art will be aware that "PID" stands for "proportional-integral-derivative." A PID controller is a generic control loop feedback mechanism that is widely used in industrial control systems, and operates by calculating an "error" value as the difference between a measured process variable and a desired setpoint. The controller attempts to minimize the error by adjusting the process control inputs. A PID controller calculation (algorithm) can involve three separate parameters, and is accordingly sometimes called three-term control: the proportional, the integral and the derivative values, denoted P, I, and D. These values can be interpreted in terms of time: P depends on the present error, I depends on the accumulation of past errors, and D is a prediction of future errors, based on current rate of change. Generally, the weighted sum of these three actions is used to adjust the process via a control element, such as the position of a control valve, or the power supplied to a heating element, for example.

In the present case, the PID controller 36 controls the operation of the electro-pneumatic regulator valve 34. The PID controller 36 can be a discrete electronic or computer device, or its functions can be implemented as software associated with a more general computing device, such as an electronic control module (ECM) 38 associated with the engine 12.

The regulator valve 34 controls the pressure ratio of the sequential turbo compressors 14, 16 by controlling the behavior of the wastegate 18. In conventional turbo systems, the wastegate is a passively-controlled mechanical device which is governed solely by a spring, thus having a constant pre-load. The wastegate is usually controlled by a pressure actuator that is connected to pressure in the exhaust manifold of the engine. The wastegate is normally closed, held shut by a spring inside the actuator. When pressure levels in the exhaust manifold exceed the force of the spring, the actuator progressively opens the wastegate, allowing exhaust flow to bypass the turbine, thus regulating manifold boost pressure (i.e. preventing an overpressure condition).

Figure 2:
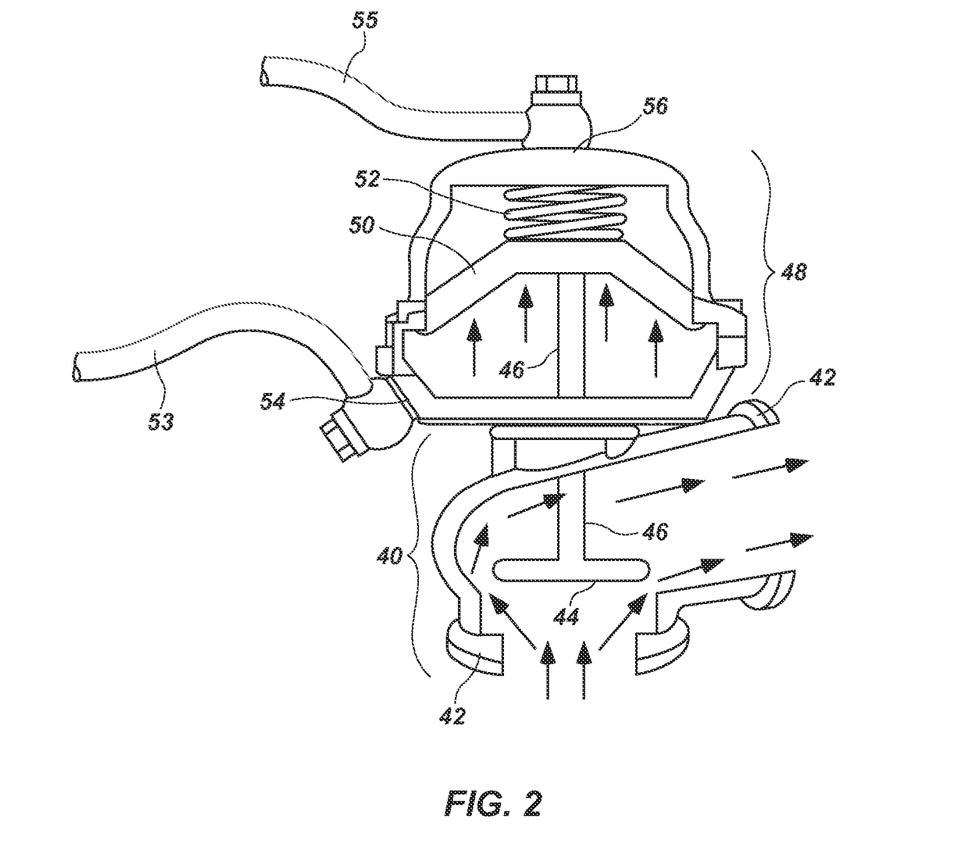
FIG. 2 is a cross-sectional operational view of a wastegate.

The wastegate 18 of the system disclosed herein operates differently, under control of the regulator 34. A detailed cross-sectional view of the wastegate 18 in an open position is shown in FIG. 2. The wastegate 18 includes a lower chamber 40, which connects to the turbine bypass conduit 42, and includes a moveable wastegate valve 44 having a valve stem 46. The valve stem 46 extends into an upper chamber 48, where it is attached to a moveable plenum 50, the valve stem 46 and plenum 50 being biased toward a closed position of the valve 44 by a biasing member, such as a spring 52. The upper chamber includes a reference air inlet 54, disposed below the plenum 50, and a regulated air inlet 56, disposed above the plenum 50. The reference air inlet 54 receives compressed intake air as a reference pressure via the reference air conduit 53, which is in fluid communication with the manifold pipe 26. The regulated air inlet 56 receives air from the reference air conduit 55, whose pressure has been potentially adjusted by the regulator valve 34. This regulated air can have a pressure that is some amount lower than the pressure of the reference air. At some point, this pressure differential will overcome the force of the spring 52, allowing the reference air to push up against the plenum 50, thus opening the wastegate valve 44. The degree to which the wastegate valve 44 is opened will depend upon both the force of the spring 52 and the pressure differential between the reference air and the regulated air.

Unlike conventional turbo systems, the sensors 30, 32 detect output or boost pressure from the first stage turbocompressor 14a and second stage turbocompressor 16a during operation of the engine 12. By processing this operational feedback data, representing these output pressures, the PID controller can control operation of the wastegate 18 via the variable regulator valve 34, to maintain a desired boost pressure ratio of output from the first and second stage turbochargers 14, 16. The system thus has a constant feedback control loop. An example can help illustrate how the system works. As the turbo system 10 operates with the engine 12, the pressure sensors 30, 32 provide boost pressure readings to the controller 36 from the first stage turbocompressor 14*a* and second stage turbocompressor 16*a*, respectively. The controller 36 computes a ratio of these two pressures, referred to herein as a boost pressure ratio, and also computes the integral and derivative of this boost pressure ratio in order to predict time-based changes in this parameter. The output signal from the controller 36 will determine how much the regulator valve 34 will change (reduce) pressure between the intake or manifold air that flows to it compared to the regulated air that flows to the wastegate 18.

It is to be appreciated that the supply of compressed air to the regulator valve 34 can be from some source other than the intake or manifold air. For example, as shown in FIG. 1, some other compressed air source, represented by air pump 35, can be used to provide compressed air to the regulator valve 34, rather than taking compressed air from the intake manifold. This alternative compressed air source can be the compressed air brake system of a heavy truck, for example. Under control of the controller 36, the regulator valve 34 can adjust the pressure of the air, from whatever source, to properly operate the wastegate 18.

Because of its construction, with the upper chamber 48 and plenum 50, the wastegate valve 44 will open if the pressure of the regulated air drops sufficiently below the pressure of the intake air. Opening the wastegate has the effect of reducing the relative power that is applied to the turbine 16*a* of the last turbocharger 16, thereby increasing the relative power that is applied to the turbine of the first turbocharger. The effect of this power change will change the boost ratio, providing more efficient cooperation of the twin turbochargers 14, 16.

Throughout various operating ranges of the engine 12, changing the settings of the regulator valve 34, via the controller 36, will cause a change in relative compressor output of the two turbocompressors 14*a*, 16*a*, thus changing the pressure readings from sensors 30, 32, resulting in further changes to the regulator valve and so forth, thus allowing constant feedback for control of the engine system. This feedback can be desirable for keeping the twin turbocharges operating at a desired efficiency. For example, in one installation of a twin-turbo system with continuous feedback control configured in accordance with this disclosure, where the target manifold air pressure is 100 psi, the desired boost pressure ratio of the first turbocompressor 14*a* compared to the second turbocompressor 16*a* is 0.396. That is, it is desired that the cold pipe pressure be about 39.6% of the manifold pressure for operation of the turbocharger system. By setting this boost ratio target in the controller 36, the controller 36 can adjust the regulator valve 34 as needed during operation of the engine to maintain this target boost ratio.

In this way, the system 10 promotes better performance throughout the operating range of the engine 12. As engine operating parameters change, for example during acceleration, and the input power to the turbocharger system changes (i.e. the volumetric flow rate and pressure of engine exhaust gasses changes), selective opening of the wastegate 18 based on boost pressure feedback from the sensors 30, 32 can allow the turbocompressors 14*a*, 16*a*, to stay closer to their combined optimal operating state than otherwise. This allows higher efficiency of operation of the turbocompressors 14*a*, 16*a*, which in turn promotes overall efficiency of the engine 12. The PID controller 36 and regulator valve 34 do not regulate overall manifold pressure ("turbo boost") like some other controllers. Instead, they control how the two turbos 14, 16 work together, and thus regulate the efficiency of the entire system.

Advantageously, this configuration also eliminates the need to change a spring inside a wastegate if it is desired to change the control characteristics of the wastegate. Because the wastegate is electro-pneumatically controlled by the regulator valve 34 under control of the PID controller 36, rather than solely controlled by a spring, changes can be made on-the-fly by downloading new parameters to the PID controller 36. Downloading new parameters to the PID controller 36 can be an option made available to anyone, or it can be restricted to authorized and trained personnel only, for example.

A multi-stage turbo charger system with continuous feedback control as disclosed herein has been installed in a prototype vehicle and successfully tested and used. Data from some of the testing is provided in the graph of FIG. 3. The left vertical axis represents pressure, the right vertical axis represents engine RPM, and the horizontal axis represents time of operation of the engine. The time units on the horizontal axis are arbitrary. In this graph, line 60 is the engine rpm. Line 62 is the intake manifold pressure, and line 64 is the exhaust manifold pressure. Line 66 is the cold pipe pressure, and line 68 represents the boost ratio—that is the ratio of the cold pipe pressure to the manifold pressure. Since the left vertical axis peaks around 100, this scale is also used to show percentages for the boost ratio curve.

Figure 3:
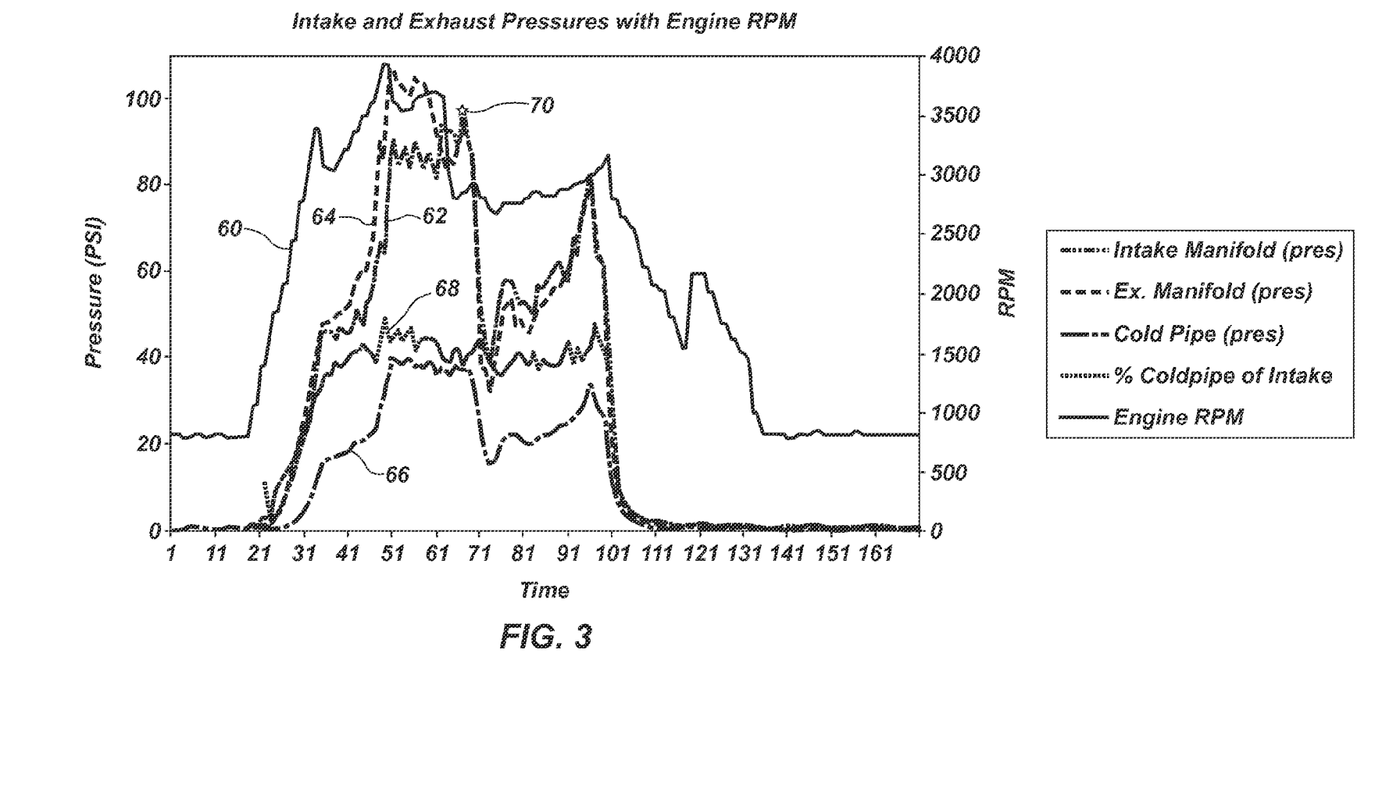
FIG. 3 is a graph of intake and exhaust pressures relative to engine rpm for a diesel engine provided with a multi-stage turbo system with continuous feedback control in accordance with the present disclosure.

As those of skill in the art will appreciate, the turbochargers do not begin operation until sometime after the engine first begins running, as can be seen at the left portion of the graph. When the turbochargers are operating, the peak intake manifold pressure (line 62) approaches 100 psi, as shown at point 70. Despite variations in the intake manifold pressure (line 62) during operation of the engine, however, the boost ratio (line 68) remains around 40 percent, meaning that the cold pipe pressure (line 66) is about 40% of the manifold pressure (line 62). It is believed that the boost ratio stays closer to its target value throughout the range of operation of the engine because of the feedback-based turbo control system disclosed herein.

Figure 4:
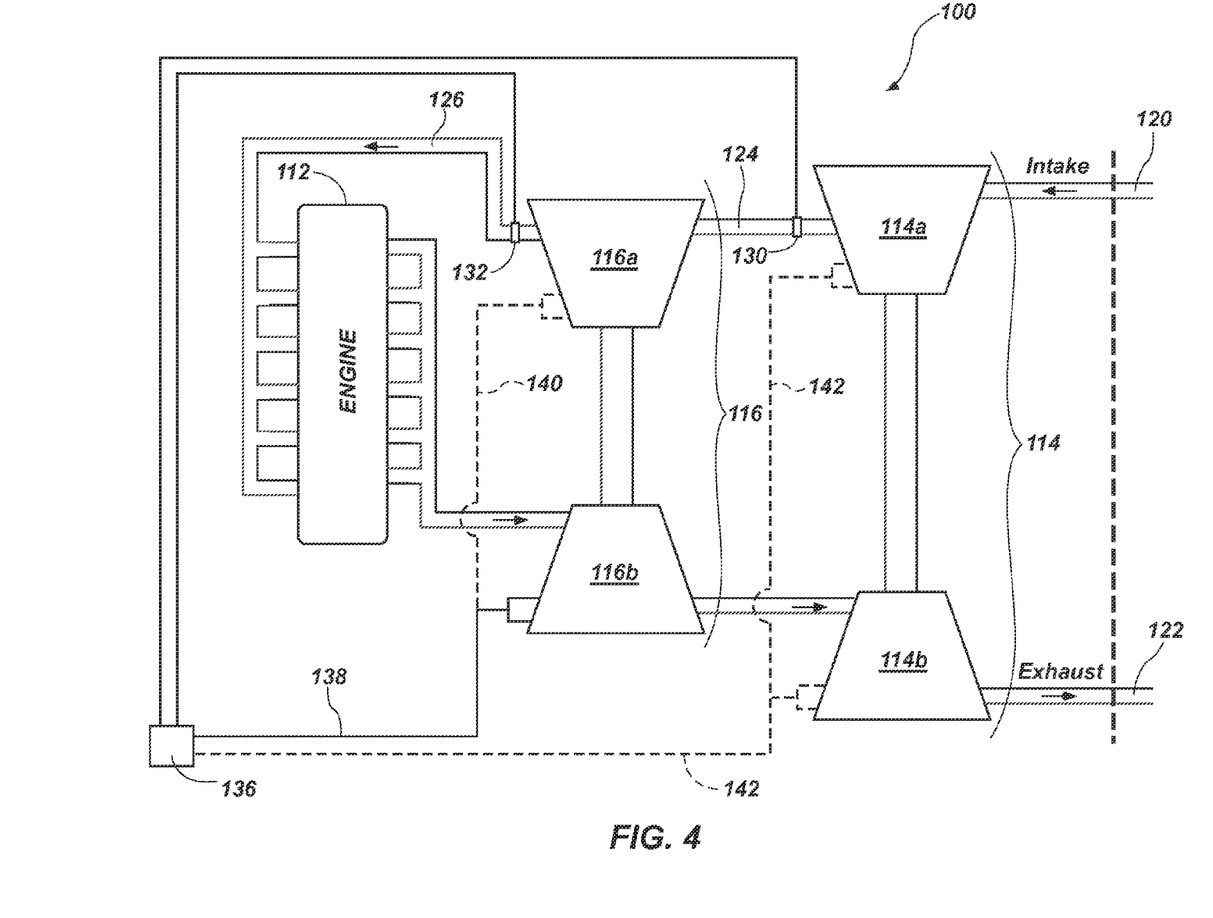
FIG. 4 is a schematic diagram of an embodiment of a multi-stage turbo system in which at least one of the turbochargers has a variable geometry turbine (VGT) or variable nozzle turbine (VNT).

The turbocharger system 10 disclosed herein can also be implemented in a turbo system that uses one or more turbochargers having a variable geometry turbine (VGT) or variable nozzle turbine (VNT). Such turbochargers are commercially available, for example under the Holset® brand from Cummins® Turbo Technologies of Charleston, S.C. A schematic diagram of one embodiment of such a system is shown in FIG. 4. This turbocharger system 100 is similar in most respects to that shown in FIG. 1. The system 100 includes a first turbocharger 114 and a second turbocharger 116, arranged in series. Each turbocharger 114, 116 includes a turbocompressor portion 114*a*, 116*a*, respectively, disposed in series in an intake air flow conduit 120, and a turbine portion 114*b*, 116*b*, respectively, disposed in series in the exhaust flow conduit 122.

A cold pipe 124 extends between the first and second turbocompressor portions, 114*a*, 116*a*, and a manifold pipe 126 connects to the intake manifold 128. A first pressure sensor 130 is disposed in the cold pipe 124, and a second pressure sensor 132 is disposed in the manifold pipe 126. This embodiment includes a controller 136, but can be configured without a regulator valve. Additionally, when using a VGT or VNT, no wastegate is needed because turbo output can be adjusted directly by the turbochargers 114, 116 themselves, through adjustment of the geometry of the turbine or compressor portion of the device, in response to signals from the controller 136. VGT's and VNT's typically include either en electric stepper motor, or their own pneumatic control valve, both of which can be controlled by electrical signals from the controller 136.

Advantageously, either or both the first turbocharger 114 and second turbocharger 116 can be a VGT or VNT. If the first compressor 114*a* is a standard turbo and the second compressor 116*a* is a VGT or VNT type turbocharger, no wastegate is be needed because the VGT or VNT turbo 116 performs the equivalent function through its variability. The VGT or VNT can easily be controlled via the controller 136 using software like that used for controlling the regulator valve 34 of the embodiment of FIG. 1. That is, the PID control methodology can be used whether the software controls a separate electro-pneumatic regulator valve or an electric motor or valve on the turbo device itself, to effectively regulate turbo output pressures. Alternatively, if both the first turbocharger 114 and second turbocharger 116 are VGT or VNT type turbos, again no wastegate is needed, and the turbo devices can be controlled by the same controller 136, as in the previous example.

Control lines 138, 140 and 142 extending from the controller 136 are intended to represent electrical wiring for transmitting control signals to the turbine and/or compressor portions of the respective turbochargers 114, 116. Some of these control wires are shown in dashed lines to indicate various optional configurations. That is, the last turbine 116*b* can be a variable turbine, and the controller 136 can be operatively coupled to control just this turbine 116*b*. Alternatively, the controller can be operatively coupled to control any of the other turbines or compressors, in various combinations, depending on the configuration of the VGT or VNT system. For example, if both the first turbocharger 114 and second turbocharger 116 are VGT or VNT type turbos, control wiring can extend from the controller 136 to both of these turbo devices, and the connection of the wiring can depend on the specific portion of the turbo device that includes a variable actuator (e.g. a stepper motor). It is also to be understood that VGT or VNT type turbos can be actuated by a compressed air source, as is the case with the regulator valve 34 in the embodiment of FIG. 1. In such a case, the controller 136 can be connected to regulate the compressed air source for desired operation, or it can be connected to the turbocharger devices and control their operation under the force of this compressed air. In short, any one of many alternative methods can be used for controlling operation of at least one of the first and second turbochargers 114, 116 by the controller 136 in order to maintain a desired boost pressure ratio.

While the examples of multi-stage turbo systems shown and described herein include two turbo stages, it is to be appreciated that the continuous feedback and control system disclosed herein can be used with multi-stage turbo systems having more than two stages. Those of skill in the art will recognize that the proliferation of turbochargers in a given engine system will tend to approach a condition of diminishing returns. Thus, using more than two turbochargers in an engine system is uncommon, and using more than three is extremely rare. Nevertheless, the system disclosed herein is applicable to any of these situations. In an engine system having more than two turbocharger stages, the number of regulator valves (34 in FIG. 1) and wastegates (18 in FIG. 1) can be one less than the number of turbo stages. Thus, a three stage turbo system can have two regulator valves, a four stage turbo system can have three regulator valves, etc. Each regulator valve can be coupled to control operation of a wastegate associated with the respective higher stage turbocharger. Thus, for example, a three stage turbocharger system will have a first regulator valve and a first wastegate that bypasses the turbocharger closest in series to the exhaust manifold of the engine, and a second regulator valve and a second wastegate that bypasses the second of three turbochargers.

It is to be noted that the number of turbocharger stages is not necessarily the same as the number of turbocharger devices. For example, turbocharged engine systems exist that include three turbochargers in only two stages: two of the turbochargers are arranged in parallel. For purposes of the system disclosed herein, such an engine system would be a two-stage turbo system, and would incorporate one regulator valve and one wastegate for a continuous feedback control system as disclosed herein.

The turbo control system disclosed herein can be a standalone system (e.g. an aftermarket or retrofit system), or it can be configured to interface with existing engine control units and sensors, with the addition of appropriate software and hardware, such as a regulator valve (34 in FIG. 1) and associated conduits. Advantageously, the PID control algorithm can be finely tuned to promote high functionality under a wide variety of conditions.

It is believed that this system is well suited for use with engines that experience changes in loading and operational parameters during use. For example, passenger vehicles, over-the-road trucks, marine engines, locomotives, logging, mining and earth-moving equipment and other applications can benefit from this system. The automotive industry in general can benefit from this system, and it can be sold as a standalone or aftermarket system. As emission standards go up, engine manufacturers are using twin turbo systems to attain higher efficiency output from their engines. As discussed above, these turbo systems are typically controlled with mechanical actuators. Replacing the mechanical actuators with a PID-controlled electro-pneumatic regulator as disclosed herein can increase efficiency and allow the engine system to constantly adapt to different conditions. Engines that experience frequent and significant dynamic load changes (e.g. stop-and-go operation), such as passenger vehicles, earth-moving equipment, etc., are likely to receive the greatest benefit from this system. On the other hand, engines that are more likely to operate in a steady-state mode, such as generators and the like, can incorporate a continuous feedback control system as disclosed herein, but are likely to receive less benefit from this type of system.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A method for controlling a multi-stage turbocharger system of an internal combustion engine with an intake manifold, comprising:
 sensing a first boost pressure in a cold pipe that extends between a first turbocharger and a second turbocharger with a sensor disposed within the cold pipe, the first boost pressure corresponding to a boosted output of the first turbocharger;
 sensing a second boost pressure corresponding to an output of the second turbocharger, the first and second turbochargers being disposed in series and the second turbocharger further compressing the output of the first turbocharger;

determining a target boost pressure ratio of the lower first boost pressure to the higher second boost pressure using a computerized controller having a processor and system memory, wherein the controller does not regulate an overall manifold pressure at the intake manifold;

operating the engine over a range of operating parameters, the operating parameters changing at least one of the first and second boost pressures; and adjusting operation of at least one of the first and second turbochargers by the controller during operation of the engine to modify at least one of the first and second boost pressures toward maintaining the target boost pressure ratio.

2. A method in accordance with claim 1, wherein controlling operation of at least one of the first and second turbochargers comprises controlling operation of a wastegate associated with one of the turbochargers.

3. A method in accordance with claim 2, wherein controlling operation of a wastegate associated with one of the turbochargers comprises:

providing a flow of pressurized manifold air to the wastegate;

controlling a regulator valve to produce a regulated air flow; and transmitting the regulated air flow to the wastegate, the wastegate selectively opening depending on a pressure difference between the regulated air and the manifold air.

4. A method in accordance with claim 1, wherein adjusting operation of at least one of the first and second turbochargers comprises adjusting settings of a variable geometry turbine or variable nozzle turbine.

5. A method in accordance with claim 1, further comprising changing software associated with the controller to adjust operating parameters, including the target boost pressure ratio, of the turbo system.

6. A method for controlling turbochargers of an internal combustion engine having an intake manifold, first and second turbochargers in fluid communication with the intake manifold and connected in series, and a cold pipe therebetween, the method comprising:

sensing a first boost pressure in the cold pipe with a sensor disposed within the cold pipe and sensing a second boost pressure in the intake manifold during operation of the first and second turbochargers, the second turbocharger further compressing an output of the first turbocharger;

determining a target boost pressure ratio of the lower first boost pressure to the higher second boost pressure using a computerized controller having a processor and system memory, wherein the controller does not regulate an overall manifold pressure at the intake manifold; and the controller adjusting operation of the first and second turbochargers to modify at least one of the first and second boost pressures toward maintaining the target boost pressure ratio during operation of the engine over a range of operating parameters, the operating parameters changing at least one of the first and second boost pressures.

7. A method in accordance with claim 6, wherein controlling operation of the first and second turbochargers comprises controlling operation of a wastegate, disposed in an exhaust conduit of the engine and associated with one of the turbochargers.

8. A method in accordance with claim 7, wherein the wastegate is associated with the second turbocharger.

9. A method in accordance with claim 7, wherein controlling operation of the wastegate comprises:

providing a flow of pressurized manifold air from the intake manifold to the wastegate;

controlling a regulator valve to produce a regulated air flow; and selectively opening the wastegate depending on a pressure difference between the regulated air and the manifold air.

10. A method in accordance with claim 9, wherein controlling the regulator valve comprises controlling a proportional, continuously adjustable variable electro-pneumatic regulator valve coupled to receive manifold air from the intake manifold and to provide regulated air to the wastegate.

11. A method in accordance with claim 10, wherein controlling the regulator valve further comprises the controller controlling a pressure release mechanism, between a manifold air inlet and a regulated air outlet, to selectively reduce pressure of the regulated air relative to the manifold air.

12. A method in accordance with claim 6, further comprising changing software associated with the controller to adjust operating parameters, including the target boost pressure ratio, of the turbochargers.

13. A method in accordance with claim 12, wherein the controller is associated with an electronic control module of the engine, and wherein changing the software associated with the controller comprises changing software of the electronic control module.

14. A method in accordance with claim 6, wherein the controller comprises a PID controller, and further comprising producing an output signal from the PID controller representing a weighted sum of the boost ratio, an integral of the boost ratio, and a derivative of the boost ratio.

15. A method in accordance with claim 6, wherein controlling operation of the first and second turbochargers comprises:

providing a control signal from the controller to a regulator valve, to selectively reduce pressure of regulated air output from the regulator valve relative to manifold air received from the engine by the regulator valve; and selectively opening a wastegate disposed in an exhaust conduit of the engine and associated with one of the turbochargers depending on a pressure difference between the regulated air and the manifold air.

16. A method for controlling an internal combustion engine having an intake manifold, first and second turbochargers in fluid communication with the intake manifold and connected in series, with a cold pipe therebetween, and a wastegate associated with the second turbocharger and disposed in an exhaust conduit of the engine, the method comprising:

detecting a first boost pressure in the cold pipe and a second boost pressure in the intake manifold during operation of the first and second turbochargers, the second turbocharger further compressing an output of the first turbocharger;

determining a target boost pressure ratio of the lower first boost pressure to the higher second boost pressure using a computerized controller having a processor and system memory, wherein the controller does not regulate an overall manifold pressure at the intake manifold;

controlling operation of the wastegate during operation of the engine over a range of operating parameters, the operating parameters changing at least one of the first and second boost pressures; and operating the wastegate via the controller by opening the wastegate and increasing the first boost pressure if the ratio of the first boost pressure to the second boost pressure is less than the target boost pressure ratio, and closing the wastegate and increasing the second boost pressure if the ratio of the first boost pressure to the second boost pressure is more than the target boost pressure ratio.

17. A method in accordance with claim 16, wherein controlling operation of the wastegate comprises:

providing a flow of pressurized manifold air from the intake manifold to the wastegate;

controlling a regulator valve to produce a regulated air flow; and selectively opening the wastegate depending on a pressure difference between the regulated air and the manifold air.

18. A method in accordance with claim 17, wherein controlling the regulator valve comprises controlling a proportional, continuously adjustable variable electro-pneumatic regulator valve coupled to receive manifold air from the intake manifold and to provide regulated air to the wastegate.

19. A method in accordance with claim 16, further comprising changing software associated with the controller to adjust operating parameters, including the target boost pressure ratio, of the turbochargers.

20. A method in accordance with claim 16, wherein the controller comprises a PID controller, and further comprising producing an output signal from the PID controller representing a weighted sum of the boost ratio, an integral of the boost ratio, and a derivative of the boost ratio.

* * * * *